APPARATUS FOR INHIBITING NON-SIGNIFICANT PULSE SIGNALS

Filed Dec. 5, 1962

INVENTOR
TREVOR D. READER

BY Edward M. Farrell
ATTORNEY

United States Patent Office 3,331,079
Patented July 11, 1967

3,331,079

APPARATUS FOR INHIBITING NON-SIGNIFICANT PULSE SIGNALS

Trevor Drake Reader, Wayne, Pa., assignor to Sperry Rand Corporation, New York, N.Y., a corporation of Delaware Filed Dec. 5, 1962, Ser. No. 242,456
8 Claims. (Cl. 346—74)

Figure 1:
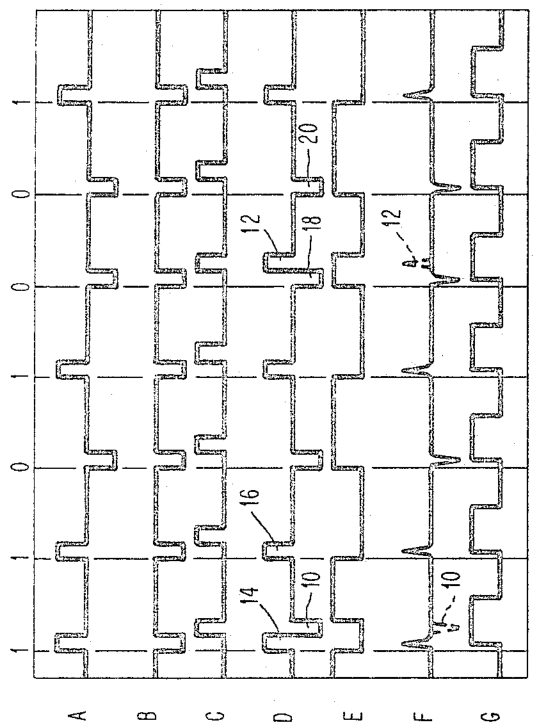

This invention relates to magnetic recording systems, and more particularly to systems involving the reading of pulse information signals on a recording medium.

In many computer systems, binary information signals are recorded on a recording medium, such as a magnetic tape or drum. Such binary signals, having one of two different characteristics, may represent a "1" or a "0." In a pulse recording system, a signal representing a "1," for example, may be represented by a pulse signal of positive polarity with respect to a point of reference potential. Likewise, a "0" may be represented by a pulse signal which has a negative polarity with respect to a point of reference potential.

The recording of pulse signals representing information offer several advantages. For example, a much greater amount of information may be stored on the recording medium. In addition, the problem of erasing a previously recorded signal by a subsequent signal is minimized. In a pulse recording system, the peak head current necessary to record the information may be minimized.

Self-sprocketing systems offer the advantage that additional clock signals need not be recorded on the recording medium since the timing signals are produced by the information signals themselves. Therefore, misalignment of signals among different channels is not too critical a problem in so-called self-sprocketing systems.

In a pulse recording system, the original signals recorded on the recording medium generally spread and must be reconverted into pulses when they are read out from the recording medium. The read-out signals are generally passed through various stages during a reading operation, such as squaring, limiting and pulse forming circuits to convert the read-out recorded information into pulses which represent "1" and "0" bits of information. In passing through these various stages, so-called "non-significant" pulse signals are produced. Non-significant pulse signals may be produced whenever the pattern of information signals include two consecutive similar types of information signals, for example, two consecutive "0's" or two consecutive "1's." These non-significant or spurious signals must be eliminated before the information signals are passed to subsequent circuits. These non-significant signals generally occurred in the past half-way between two information signals, i.e., at a time one-half a digit period after an information signal.

In the past, inhibit signals corresponding in time duration to a three quarter digit period have been used to eliminate non-significant pulse signals. These inhibit signals are generally generated by the information signals. Since the non-significant signals have occurred in the middle of the digit period, the three quarter digit inhibit signal prevented the passage of the non-significant signals to subsequent circuits while still permitting passage of the information signals.

If the speed of the recording medium varies substantially, the time interval between the information signals also varies. If the recording medium slows down, the non-significant signals fall outside of the fixed three quarter delay since the three quarter inhibit signal is based upon some predetermined constant speed of the recording medium. If this occurs, the non-significant signals will not be inhibited but will be passed on to subsequent circuits to produce errors in the system. Likewise, if the recording medium speeds up, a subsequent information signal may be inhibited by the three quarter signal, again producing an error into the system.

It is an object of this invention to provide an improved pulse recording system which permits variations in the time between recorded information signals without causing errors in the read out signals.

It is a further object of this invention to provide an improved pulse writing and reading system in which variations in the speed of the recording medium will not substantially affect the accuracy of the read-out information.

In accordance with the present invention, a system for recording a series of information pulse signals is provided. The pulse signals are separated in time by a full digit period. Whenever two consecutive information pulses are of the same characteristic, an additional signal is generated. The additional signal is recorded at a time substantially less than one-half a digit period after the first of the two consecutive information signals.

Figure 2:
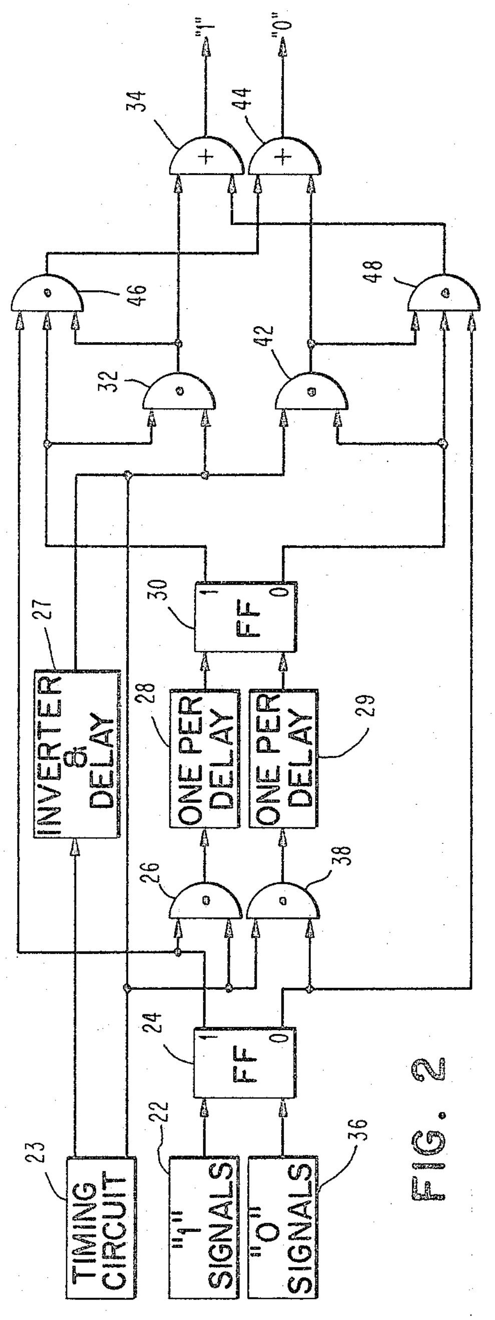

Other objects and advantages of the present invention will be apparent and suggest themselves to those skilled in the art from a reading of the following specification and claims in conjunction with the accompanying drawings, in which:

FIGURE 1 is a series of waveforms, illustrated for purposes of explaining the present invention, and FIGURE 2 is a block diagram illustrating one embodiment of the present invention.

Referring particularly to FIGURE 1, a series of waveforms are illustrated in order to describe the general application of the present invention. Waveform A illustrates a series of pulses representing "1" and "0" bits of information to be recorded on a recording medium, such as a magnetic tape. The positive going pulses may be considered as representing "1's" and the negative going pulses may be considered as representing "0's." Waveforms B and C are gating signals and will be described in connection with the description of FIGURE 2. Waveform B is generally in the same time relationship with respect to waveform A, with waveform C being delayed with respect to waveform B.

Waveform D illustrates the pulse signals which are to be actually recorded on the recording medium. It is noted that all the pulse signals of waveform A are included in waveform D, in addition to pulses 10 and 12. The pulse 10 is between two "1" of information pulses 14 and 16. The pulse 12 is between two "0" information pulses 18 and 20. Whenever two consecutive signals are of the same characteristic, a non-significant or correction pulse is generated and recorded along with the information signals.

Waveform E represents the information recovered from the recording medium after a reading operation. The recovered information is generally applied to various squaring and limiting circuits to arrive at the signal represented by waveform E. The various stages for producing the signal of waveform E will not be described in detail since they are well known to those skilled in the art and are only indirectly related to the present invention.

The signal represented by waveform E is generally applied to suitably differentiating or pulse forming circuits to produce a signal represented by the waveform F. It is noted that the pulses illustrated in waveform F are produced for each change in direction of the signal of waveform E. The waveform F corresponds generally to the waveform D which was originally recorded. The waveform F still includes pulses 10 and 12, which are considered non-significant. While these pulses were put in during recording to achieve certain advantages in recording, they must be removed during the reading operation.

Before the information contained in waveform F can be passed on to subsequent utilization circuits, the non-significant signals are eliminated by means of suitable inhibit signals. The waveform G, consisting of square wave signals of approximately one-half of a digit period, may be used to eliminate the spurious or non-significant signals 10 and 12. The signal represented by waveform G may be generated by a one-half delay flop circuit. This delay flop circuit may be triggered by the information signals of waveform F. The signals of waveform G are used to inhibit the passage of the non-significant signals 10 and 12 while still permitting the passage of the information signals to subsequent circuits. It is noted that the use of a one-half digit inhibit signal differs from the use of the three-quarter inhibit signal used heretofore. The use of the shorter period inhibit signal is made possible because the non-significant pulses are recorded shortly after the recording of an information signal rather than in the middle of the digit period.

A system in a read out portion of a magnetic recording system is described in a copending patent application of Herbert F. Welsh, entitled, "Phase Modulation Reading System," Ser. No. 74,112, filed Dec. 6, 1960, now U.S. Patent No. 3,243,580, and assigned to the same assignee as the present invention. In this copending patent application a three-quarter delay flop signal is used to inhibit the passage of non-significant signals. Since the read-out portion of the system will become evident of a reading of the aforementioned patent application, no details relating thereto, will be shown in this application.

It may be seen from the above description that the speed variations of a recording medium will not substantially affect the operation of a system involving the present invention. Since the non-significant signals are recorded immediately after the information signal and substantially less than one-half of a digit period, a delay flop of one-half of a digit may be used in place of the delay flop of a three-quarter digit period. This arrangement permits a wide variation in the speed of the recording medium while still eliminating the spurious or non-significant signals.

In connection with FIGURE 2, the various means for generating timing signals within a computer system will not be shown or described in detail. It is well known to those in the computer art that the computer includes means for generating timing or clock signals. These signals control the timing of the application of information signals, as well as controlling various of the functions within the computer. The waveform 1D illustrates the total number of pulses to be recorded at a recording head, in accordance with the present invention. As mentioned, additional pulses, such as the correction pulses 10 and 12 are included, in addition to the information pulses.

First consider how the information is recorded when no correction pulses, such as pulses 10 and 12, are involved. If a "1" bit of information is to be recorded, a signal from an information source 22 is applied to set a flip-flop circuit 24. The "1" output terminal of the flip-flop 24 is switched to a low state, with the output signal therefrom being applied to a negative inverting AND gate 26. A negative pulse signal, represented by waveform 1B, is also applied from a timing circuit 23 to the AND gate 26. The latter signal, being in a low or negative state during the signal period, permits the "1" bit of information (see waveform A) to be applied through a delay circuit 28 to set a second flip-flop 30. A delay time, which may extend up to one digit period, exists between the operations of the flip-flops 24 and 30.

The output signal from the flip-flop 30 is applied to a negative inverting AND circuit 32. A form of gating signal, represented by the waveform 1C, is also applied from the timing circuit 23 to the AND gate circuit 32. The output signal from the AND gate circuit 32, developed when two low input signals are applied thereto, is applied to an OR gate circuit 34. The output signal from the OR gate circuit 34, represented by a positive pulse, may then be applied to a recording head to record information on a recording medium, such as tape or a drum.

Consider now the recording of a "0" bit of information. In this case, a signal is produced by the "0" signal source 36 to reset the flip-flop 24. The "0" output side of the flip-flop 24, being in a low state during its reset condition, is connected to a negative inverting AND gate circuit 38. Again, the gating signal represented by the waveform 1B, is applied to the AND circuit 38 to permit "0" information to reset the flip-flop 30 placing it in the "0" state.

The output from the flip-flop 30, representing "0" information, is applied to a negative inverting AND gate circuit 42. Again, a gating signal represented by a waveform 1A, is also applied from the timing circuit 23 to the AND gate circuit 42. An output signal from the AND gate circuit 42 is developed when both input signals are low, with this ouput signal representing "0" information. The output signal from the AND gate 42 is applied to an OR gate 44, which may then be applied to a recording head for recordation on a recording medium, such as a tape or drum.

Thus, it is seen that in order to record "1" information that the input signal follows a path from the source 22, through the flip-flop 24, the AND circuit 26, the delay circuit 28, the flip-flop circuit 30, the AND gate circuit 32, the OR gate circuit 34, and finally to the recording head. Likewise, "0" input information signal passes from the source 36, through the flip-flop 24, the delay circuit 29, the AND gate circuit 38, the flip-flop 30, the AND gate circuit 42, the OR gate circuit 44 and finally to the recording head.

Let us now consider the generation of the correction signals which occur with two consecutive information signals of the same type. If two information signals, for example, represented by pulses 14 and 16 in waveform 1D, are to be recorder, the correction pulse 10 will also be generated and recorded. It was seen that a "1" bit of information from the source 22 is first stored in the flip-flop circuit 24. The stored information from the flip-flop 24 is passed to the second flip-flop 30 after a one digit period delay. Thus, when a second "1" bit of information is applied from the source 22 to the flip-flop 24, the first "1" bit of information will be stored in the flip-flop circuit 30. In this situation, it is now necessary to record an additional correction pulse which has a "0" characteristic.

The "1" output sides of the two flip-flops 24 and 30, being in a negative or low condition, are connected to a negative inverting AND gate circuit 46. It is noted that the output signal from the AND gate 46 is connected to the OR gate circiut 44 which is used to pass "0" bits of information. It is also noted that the output from the AND circuit 32 is also applied to the input circuit of the AND gate circuit 46. Thus, it is seen that the three input signals to the AND gate circuit 46 must all be low in order to produce an output signal which will cause a signal having "0" characteristics to be recorded.

When the flip-flops 24 and 30 are both storing "1" bits of information, the signal represented by the waveform 1C is high at the time during which the non-significant signals are to be records. During the pulse time of waveform 1C, the output signal level at the AND gate 32 is low. The low output signal from the AND gate 32 may therefore be considered as a gating signal to permit a pulse to be generated at the output circuit of the AND gate circuit 46 when the "1" sides of both flip-flops 24 and 30 are low. As previously mentioned, in a particular embodiment of the present invention, all the AND gate circuits illustrated are known as negative inverting AND gates. This means that only if all the input signals are low or negative, then the output signal will be high or positive.

When the flip-flops 24 and 30 are both storing "1" bits of information, their "1" output sides will both be in the low state. When the pulse signals represented by waveform 1C, are applied from an inverter and delay circuit 27 to the AND gate circuit 32, this means that a high input signal is applied to the AND gate 32. In this case, the output from the AND gate circuit 32 is low. Thus the three signals applied to the AND gate circuit 46 are all low to cause a correction pulse signal to be generated and passed through the OR gate circuit 44 to cause a pulse signal having a "0" characteristic to be recorded.

A similar situation results when two consecutive information signals are "0". In this case, both flip-flops 24 and 30 will store "0" bits of information. The "0" output sides of both flip-flops will therefore be in a low condition, The "0" outputs from the flip-flops 24 and 30 are applied to a negative inverting AND gate 48. When the output level from the AND gate 42 is also low, as it is during the non-significant pulse period as indicated by the positive pulses of Waveform 1C, the AND gate 48 develops a pulse which is applied to the OR gate 34 thereby causing a correction signal having a "1" characteristic to be recorded.

It is seen that during the non-significant portion of the signal, reperesented by the positive delayed pulse signals in waveform 1C, that the output voltage level from both the AND gates 32 and 42 are low. During the significant phase indicated by the negative pulses of waveform 1B, the output level from one of the gate circuits 32 or 42 will be high thereby inhibiting the passage of signals through one of the AND gates 46 or 48. The other AND gate not inhibited by the output signal level from the AND gate 32 or 42 will be inhibited during the significant phase by the output signal level from the flip-flop circuit 30.

Let us now consider a situation where a "1" bit of information is followed by a "0" bit. In this case, the flip-flop 30 will store a "1" and the flip-flop 24 will store a "0" during the non-significant period. Since the "1" output side of the flip-flop 24 is high, no signals will pass through the AND gate circuit 46. Likewise, since the "0" output side of the flip-flop 30 is also high, no signals will pass through the AND gate 48.

In like manner, if a "0" bit of information is followed by a "1" bit, the flip-flop 30 will store a "0" and the flip-flop 24 will be storing a "1" during the non-significant period. In this case, the "0" side of the flip-flop 24 will be high to inhibit the passage of any signals through the AND gate 48. Also, the "1" side of the flip-flop 30 will be high to prevent the passage of any signal through the AND gate 46.

Thus it is seen that when one signal is followed by a second signal of a different characteristic that no additional or correction pulses are recorded. The reason for this is that neither of the AND gates 46 or 48 will develop an output signal when the consecutive information signals are of different characteristics.

However, when two consecutive signals are of the same characteristic, one or the other of the AND gate circuits 46 or 48 will generate a signal at its output. The developed signal is passed through one of the OR gates 34 or 44 to cause a correction or additional signal to be recorded. The correction pulse, as mentioned, is of the opposite type to the two consecutive information signals.

Also, it is noted that the information is recorded during the significant phase of the signal period and the correction pulses are recorded during the non-significant phase of the signal period.

It may be observed that the system always returns to a point of reference, since no two recorded pulse signals are of the same polarity. A greater degree of "packing" is therefore possible in utilizing the present invention. One reason for this is that low level signals may be recorded without the likelihood of signals from one channel overlapping signals from an adjacent channel or previous or subsequent recorded signals appearing in the same channel.

A more complete detailed description of this double pulse type of recording is described in a copending patent application of G. Cogar et al. entitled, "Recording System," Ser. No. 201,197, filed June 8, 1962, now U.S. Patent No. 3,276,033, and assigned to the same assignee as the present invention.

It is noted that the correction pulses 10 and 12 are recorded at a time substantially less than one-half of a digit period following an information pulse. Because of this, likelihood that the correction pulses will ever be considered as an information pulse as a result of a slowing down of a recording medium is greatly minimized. Also, the likelihood that information pulses will be eliminated as a result of a slowing down of a recording medium is greatly minimized. Also, the likelihood that information pulses will be eliminated as a result of a fixed three quarter delay flop inhibit signal as a result of a speeding up of the recording medium is also minimized.

Consequently, it is seen that the present invention has provided an improved system which minimizes the effects of variations in the recording medium, such as a tape or drum.

I claim:

1. A system for recording positive and negative pulse signals comprising means for detecting two consecutive pulse signals of the same polarity, means responsive to the detection of said two consecutive pulse signals of the same polarity for recording an additional pulse signal at a time less than one-half the time period between two pulses after the recording of a first of two consecutive pulse signals of the same polarity.

2. In a system for recording a bit of information in the form of a positive or negative pulse, means for detecting two consecutive pulses of the same polarity, means responsive to the detection of said two consecutive pulses of the same polarity for recording an additional pulse signal at a time period substantially less than one-half a digit signal period after the recording of a first of two consecutive signals of the same polarity.

3. In a system for recording a bit of information in the form of a positive or negative pulse, means for detecting two consecutive pulses of the same polarity, means responsive to the detection of said two consecutive pulses of the same polarity for recording an additional pulse signal at a time period substantially less than one-half a digit signal period after the recording of a first of two consecutive signals of the same polarity, and said additional pulse signal being of an opposite polarity to said two consecutive signals.

4. In a system for recording either a positive or negative information pulse signal once per digit period with said pulse signals representing "1" or "0" bits of information, means for detecting two consecutive pulse signals of the same polarity, means responsive to the detection of said two consecutive pulse signals of the same polarity for recording a compensating pulse signal at a time period substantially less than one-half of said digit period after the recording of a first of two consecutive signals of the same polarity, and said compensating pulse signal being of the opposite polarity to said two consecutive signals.

5. A system as set forth in claim 4 wherein storage means are provided to store said two consecutive signals for comparison purposes prior to recording.

6. In a system for recording a bit of information each digit period, a circuit for recording bits of information in the form of positive and negative pulses, means for comparing two consecutive bits of information prior to recording, means for generating and recording an additional pulse signal whenever said two consecutive signals are of the same type, and means for recording said additional pulse signal at a time period substantially less than one-half a digit period signal after the recording of the first of said two consecutive signals.

7. In a system for recording a bit of information each digit period, a circuit for recording bits of information in the form of positive and negative pulses, means for comparing two consecutive bits of information prior to recording, means for generating and recording an additional pulse signal whenever said two consecutive signals are of the same type, means for recording said additional pulse signal at a time period substantially less than one-half a digit period signal after the recording of the first of said two consecutive signals, and said additional pulse signal being of the opposite polarity to the pulses recorded for said two consecutive bits of information.

8. In a system for magnetically recording a bit of binary information each digit period, a circuit for recording bits of information in the form of positive and negative pulses, a pair of flip-flop circuits for storing and comparing two consecutive bits of information prior to recording, a delay circuit interposed between said pair of flip-flop circuits to delay an applied signal by substantially one full digit period, means for generating and recording a compensating pulse signal whenever said two consecutive signals are of the same type, means for recording said additional pulse signal at a time period substantially less than one-half a digit period signal after the recording of the first of said two consecutive signals, and said compensating pulse signal being of the opposite polarity to the pulses recorded for said two consecutive bits of information.

References Cited

UNITED STATES PATENTS

| | | | |
|---|---|---|---|
| 2,734,186 | 2/1956 | Williams ---------- | 340—174.1 |
| 2,917,726 | 12/1959 | Golden et al. ------ | 340—174.1 |

BERNARD KONICK, *Primary Examiner.*

A. I. NEUSTADT, *Assistant Examiner.*